United States Patent [19]

Kishine et al.

[11] Patent Number: 6,063,871

[45] Date of Patent: May 16, 2000

[54] METALLOCENE POLYETHYLENE BLEND COMPOSITIONS

[75] Inventors: Masahiro Kishine, Yamguchi; Keiji Watanabe, Yamaguchi; Toshiyuki Tsutsui, Yamaguchi; Katsunori Yano, Yamaguchi, all of Japan

[73] Assignee: Mitsui Petrochemical Industries, Inc., Tokyo, Japan

[21] Appl. No.: 08/809,583

[22] PCT Filed: Jul. 24, 1996

[86] PCT No.: PCT/JP96/02072

§ 371 Date: Mar. 24, 1997

§ 102(e) Date: Mar. 24, 1997

[87] PCT Pub. No.: WO97/04026

PCT Pub. Date: Feb. 6, 1997

[30] Foreign Application Priority Data

Jul. 24, 1995 [JP] Japan ................................ 7-187350

[51] Int. Cl.[7] .................................................. C08L 23/00
[52] U.S. Cl. ............................................................ 525/240
[58] Field of Search ............................................. 525/240

[56] References Cited

U.S. PATENT DOCUMENTS

| | | | |
|---|---|---|---|
| 5,189,106 | 2/1993 | Morimoto et al. | 525/240 |
| 5,272,236 | 12/1993 | Lai et al. | 526/160 |
| 5,382,630 | 1/1995 | Stehling et al. | 525/240 |
| 5,382,631 | 1/1995 | Stehling et al. | 525/240 |
| 5,494,965 | 2/1996 | Harlin et al. | 525/240 |
| 5,594,071 | 1/1997 | Takahashi et al. | 525/240 |
| 5,656,686 | 8/1997 | Van Laak et al. | 525/240 |
| 5,663,236 | 9/1997 | Takahashi et al. | 525/240 |
| 5,858,491 | 1/1999 | Geussens et al. | 525/240 |

FOREIGN PATENT DOCUMENTS 0598626  5/1994  European Pat. Off. .

OTHER PUBLICATIONS

Williams et al. Polymer Letters, vol. 6, pp. 621–624 (1968).
Speed et al. "Structure/Property Relationships in Exxpol (tm) Polymers", Society of Plastics Engineers Polyolefins VII International Conference, Houston, TX, Feb. 24–27 (1991).

*Primary Examiner*—Donald R. Wilson

[57] ABSTRACT

An ethylene type polymer composition comprising 20 to 90% by weight of an ethylene type polymer (A) and 80 to 10% by weight of an ethylene type polymer (B). The ethylene type polymer (A) is an ethylene polymer or a copolymer of ethylene and an α-olefin of 3 to 20 carbon atoms and has a density ($d_A$) of 0.96 to 0.980 g/cm$^3$ and an intrinsic viscosity (η) of 0.5 to 3.0 dl/g. The ethylene type polymer (B) is an ethylene polymer or a copolymer of ethylene and an α-olefin of 3 to 20 carbon atoms and has a density ($d_B$) of 0.91 to 0.965 g/cm$^3$ and an intrinsic viscosity (η) of 1.0 to 10 dl/g. At least one of the ethylene type polymers (A) and (B) is an ethylene type polymer prepared by the use of a metallocene catalyst. The ethylene type polymer composition has the properties: $d_A/d_B$ is larger than 1; the density is 0.940 to 0.970 g/cm$^3$; the MFR is of 0.005 to 20 g/10 min; the MFR and the melt tension (MT) satisfy the relation $\log(MT) \geq -0.4 \log(MFR) + 0.7$; and the diametrical swell ratio exceeds 1.35. From this composition, molded articles having excellent mechanical strength and rigidity can be obtained.

2 Claims, No Drawings

METALLOCENE POLYETHYLENE BLEND COMPOSITIONS

TECHNICAL FIELD

The present invention relates to ethylene type polymer compositions having high melt tension and high diametrical swell ratio and showing excellent mechanical strength and rigidity.

BACKGROUND ART

Ethylene type polymers such as an ethylene polymer and an ethylene/α-olefin copolymer have been conventionally molded by various molding (or forming) methods such as blow molding, vacuum or pressure forming, calendering, inflation molding, extrusion molding, expansion molding, stretched film molding and injection molding, and they have been widely employed.

The ethylene type polymers are required to have various properties depending on the purpose or the molding method. For example, in the production of films by means of high-speed inflation molding, ethylene type polymers having high melt tension should be employed to inhibit instability or breakage of bubbles. In the production of cans for industrial chemicals, drum cans, bottles or the like by means of blow molding, ethylene type polymers having high swell ratio (diametrical swell ratio) should be employed to obtain blow molded articles having good shape of pinch-off portions and narrow wall thickness distribution. The blow molded articles are generally required to have properties of high impact strength, and in addition thereto they are recently required to have high rigidity to improve durability and economical effects.

By the way, the ethylene type polymers are conventionally prepared using catalysts such as Ti catalysts or Cr catalysts (Philips catalysts) or by a high-pressure method. Among various ethylene type polymers, those prepared by the use of Ziegler-Natta catalysts typified by Ti catalysts, esp. $MgCl_2$ supported type Ti catalysts, have molecular structure almost free from long-chain branches and show excellent rigidity and impact resistance. However, they are inferior in the moldability to the ethylene type polymer prepared by the use of Cr catalysts. Meanwhile, the ethylene type polymers prepared by the high-pressure method and by the use of Cr catalysts have higher melt tension and swell ratio than those by the use of Ziegler-Natta catalysts and have excellent moldability. However, they have molecular structure with long-chain branches and are inferior in the rigidity and impact resistance.

In order to improve the properties of the ethylene type polymers, various proposals have been made. For example, in Japanese Patent Laid-Open Publication No. 12735/1980, a blend of polyethylene prepared by the use of Ziegler-Natta catalyst and polyethylene prepared by a high-pressure method is proposed. In Japanese Patent Laid-Open Publication No. 36546/1985, a blend of polyethylene prepared by the use of Ziegler-Natta catalyst and polyethylene prepared by the use of Cr catalyst is proposed. However, these polyethylene blends are inferior to the ethylene type polymers prepared by the use of Ziegler-Natta catalysts in rigidity and impact resistance, though they are improved in the moldability.

Under such circumstances as mentioned above, the present inventors have studied, and they have found that an ethylene type polymer composition comprising a specific high-density ethylene type polymer and a specific ethylene type polymer, in which at least one of them is prepared by the use of a metallocene catalyst and the density ratio therebetween exceeds 1, is excellent in moldability, stress crack resistance, mechanical strength and rigidity. The present inventors have also found that such a composition can be molded into articles for a wider variety of uses by various methods such as blow molding, vacuum or pressure forming, calendering, inflation molding, extrusion molding, expansion molding, stretched film molding and injection molding. Based on the finding, the present invention has been accomplished.

The present invention has an object to provide an ethylene type polymer composition which is capable of being molded into articles for a wider variety of uses by various methods such as blow molding, vacuum or pressure forming, calendering, inflation molding, extrusion molding, expansion molding, stretched film molding and injection molding and from which molded articles of excellent mechanical strength and rigidity are obtainable.

DISCLOSURE OF THE INVENTION

The ethylene type polymer composition according to the invention is an ethylene type polymer composition comprising:

(A) an ethylene type polymer in an amount of 20 to 90% by weight, said ethylene type polymer being an ethylene polymer or a copolymer of ethylene and an α-olefin of 3 to 20 carbon atoms and having the following properties:
 (A-1) the density ($d_A$) is in the range of 0.96 to 0.98 g/cm$^3$ and
 (A-2) the intrinsic viscosity ($\eta$) is in the range of 0.5 to 3.0 dl/g; and (B) an ethylene type polymer in an amount of 80 to 10% by weight, said ethylene type polymer being an ethylene polymer or a copolymer of ethylene and an α-olefin of 3 to 20 carbon atoms and having the following properties:
 (B-1) the density ($d_B$) is in the range of 0.91 to 0.965 g/cm$^3$, and
 (B-2) the intrinsic viscosity ($\eta$) is in the range of 1.0 to 10 dl/g, at least one of said ethylene type polymer (A) and said ethylene type polymer (B) being an ethylene type polymer prepared by the use of a metallocene catalyst, wherein said ethylene type polymer composition has the following properties:
 (1) a ratio ($d_A/d_B$) of the density ($d_A$) of the ethylene type polymer (A) to the density ($d_B$) of the ethylene type polymer (B) is larger than 1;
 (2) the density is in the range of 0.940 to 0.970 g/cm$^3$;
 (3) the melt flow rate (MFR, measured at 190° C. under a load of 2.16 kg) is in the range of 0.005 to 20 g/10 min;
 (4) the melt flow rate (MFR) and the melt tension (MT) satisfy the following relation $\log(MT) \geq -0.4 \log(MFR) + 0.70$;

and
 (5) the diametrical swell ratio exceeds 1.35.

The ethylene type polymer (A) and/or the ethylene type polymer (B) can be prepared by the use of a carrier supported metallocene catalyst comprising:

[I] a transition metal compound represented by the following formula (I):

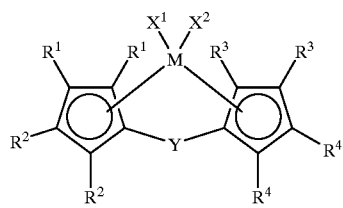

(I)

wherein M is a transition metal atom of Group 4 to Group 6 of the periodic table, $R^1$, $R^2$, $R^3$ and $R^4$ may be the same as or different from each other, they are each hydrogen atom, a halogen atom, a hydrocarbon group of 1 to 20 carbon atoms, a halogenated hydrocarbon group of 1 to 20 carbon atoms, a silicon-containing group, an oxygen-containing group, a sulfur-containing group, a nitrogen-containing group or a phosphorus-containing group, or a part of the adjacent groups of $R^1$ to $R^4$ are bonded to each other to form at least one ring together with carbon atoms to which they are bonded, $X^1$ and $X^2$ may be the same as or different from each other, and are each hydrogen atom, a halogen atom, a hydrocarbon group of 1 to 20 carbon atoms, a halogenated hydrocarbon group of 1 to 20 carbon atoms, an oxygen-containing group, a sulfur-containing group or a nitrogen-containing group, and Y is a divalent hydrocarbon group, a divalent silicon-containing group or a divalent germanium-containing group;

[II] a compound which is capable of activating the transition metal compound [I] and is at least one compound selected from:

(II-1) an organoaluminum compound, (II-2) an aluminoxane, and (II-3) a compound which reacts with the transition metal compound [I] to form an ion pair; and

[III] a fine particle carrier.

The ethylene type polymer composition according to the invention shows excellent moldability and can be molded into articles having excellent rigidity and mechanical strength such as stress crack resistance.

BEST MODE FOR CARRYING OUT THE INVENTION

The ethylene type polymer composition according to the invention is described in detail hereinafter.

The ethylene type polymer composition of the invention is formed from an ethylene type polymer (A) and an ethylene type polymer (B), and at least one of these ethylene type polymers is prepared by the use of a metallocene catalyst.

The components of the polymers are now described.

(A) Ethylene Type Polymer

The ethylene type polymer (A) for constituting the ethylene type polymer composition of the invention is an ethylene homopolymer or a random copolymer of ethylene and an α-olefin of 3 to 20 carbon atoms.

Examples of the α-olefins of 3 to 20 carbon atoms include propylene, 1-butene, 1-pentene, 1-hexene, 4-methyl-1-pentene, 1-octene, 1-decene, 1-dodecene, 1-tetradecene, 1-hexadecene, 1-octadecene, 1-eicosene and mixtures thereof.

In the ethylene type polymer (A), it is desirable that the units derived from ethylene are contained in amounts of 60 to 100% by weight, preferably 80 to 100% by weight, more preferably 90 to 100% by weight, and the units derived from the α-olefin of 3 to 20 carbon atoms are contained in amounts of 0 to 40% by weight, preferably 0 to 20% by weight, more preferably 0 to 10% by weight.

In the present invention, the composition of the ethylene type polymer can be determined by $^{13}$C-NMR spectrum. The $^{13}$C-NMR spectrum of the ethylene type polymer is generally obtained by measuring a sample solution obtained by homogeneously dissolving about 200 mg of a sample in 1 ml of hexachlorobutadiene in a sample tube having a diameter of 10 mm. The measurement is carried out under the conditions of a measuring temperature of 120° C., a measuring frequency of 25.05 MHz, a spectrum width of 1,500 Hz, a pulse repetition time of 4.2 sec and a pulse width of 6 μsec.

(A-1) The ethylene type polymer (A) has a density ($d_A$) of 0.96 to 0.98 g/cm$^3$, preferably 0.965 to 0.980 g/cm$^3$.

In the present invention, the density of the ethylene type polymer is measured in the following manner. Strands obtained in the measurement of melt flow rate described below are heat treated at 120° C. for 1 hour, then gradually cooled to room temperature over a period of 1 hour, followed by measuring the density by a gradient density tube.

(A-2) The ethylene type polymer (A) has an intrinsic viscosity (η) of 0.5 to 3.0 dl/g (MFR: 1,000 to 0.01 g/10 min), preferably 0.8 to 2.0 dl/g.

In the present invention, the intrinsic viscosity (η) of the ethylene type polymer is measured in decalin at 135° C.

The melt flow rate of the ethylene type polymer is measured at 190° C. under a load of 2.16 kg in accordance with ASTM D 1238-65T.

The ethylene type polymer (A) preferably is one prepared by the use of a metallocene catalyst, and particularly preferably is one prepared by the use of the later-described metallocene catalyst.

(B) Ethylene Type Polymer

The ethylene type polymer (B) for constituting the ethylene type polymer composition of the invention is an ethylene homopolymer or a random copolymer of ethylene and an α-olefin of 3 to 20 carbon atoms. Examples of the α-olefins of 3 to 20 carbon atoms are the same as those described for the ethylene type polymer (A).

In the ethylene type polymer (B), it is desirable that the units derived from ethylene are contained in amounts of 60 to 100% by weight, preferably 80 to 98% by weight, more preferably 90 to 96% by weight, and the units derived from the α-olefin of 3 to 20 carbon atoms are contained in amounts of 1 to 40% by weight, preferably 2 to 20% by weight, more preferably 4 to 10% by weight.

(B-1) The ethylene type polymer (B) has a density ($d_B$) of 0.91 to 0.965 g/cm$^3$, preferably 0.915 to 0.960 g/cm$^3$, more preferably 0.920 to 0.960 g/cm$^3$.

(B-2) The ethylene type polymer (B) has an intrinsic viscosity (η) of 1.0 to 10 dl/g (MFR: 35 to 0.0003 g/10 min), preferably 3.0 to 10 dl/g.

The ethylene type polymer (B) preferably is one prepared by the use of a metallocene catalyst, and particularly preferably is one prepared by the use of the below-described metallocene catalyst.

Preparation of Ethylene Type Polymer

At least one of the ethylene type polymer (A) and the ethylene type polymer (B) is prepared by the use of a metallocene catalyst, and it is preferable that both of them are prepared by the use of a metallocene catalyst.

In the present invention, employable as the metallocene compound is a carrier supported metallocene compound comprising:

[I] a transition metal compound having a specific structure;

[II] a compound which is capable of activating the transition metal compound [I] and is at least one compound selected from:
(II-1) an organoaluminum compound,
(II-2) an aluminoxane, and
(II-3) a compound which reacts with the transition metal compound [I] to form an ion pair; and

[III] a fine particle carrier.

The components for constituting the catalyst are described below.

The transition metal compound [I] employable in the invention is, for example, a bridge type metallocene compound represented by the following formula (I):

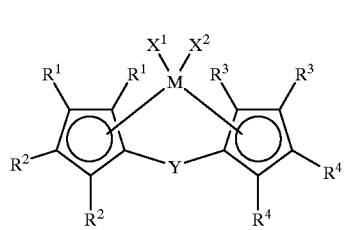

wherein M is a transition metal atom of Group 4 to Group 6 of the periodic table, specifically titanium, zirconium, hafnium, vanadium, niobium, tantalum, chromium, molybdenum or tungsten, preferably titanium, zirconium or hafnium, particularly preferably zirconium.

Substituent Groups $R^1$ to $R^4$ $R^1$, $R^2$, $R^3$ and $R^4$ may be the same as or different from each other, they are each hydrogen atom, a halogen atom, a hydrocarbon group of 1 to 20 carbon atoms which may be halogenated, a silicon-containing group, an oxygen-containing group, a sulfur-containing group, a nitrogen-containing group or a phosphorus-containing group, or a part of the adjacent groups of $R^1$ to $R^4$ are bonded to each other to form at least one ring together with carbon atoms to which they are bonded. In the formula, a pair of each $R^1$ to $R^4$ appear, and this indicates that the groups (or atoms) with the same symbols are preferably bonded to each other to form a ring, for example, $R^1$ and $R^1$ are preferably bonded to form a ring.

The halogen atom is fluorine, chlorine, bromine or iodine.

Examples of the hydrocarbon groups of 1 to 20 carbon atoms include:

alkyl groups, such as methyl, ethyl, n-propyl, isopropyl, n-butyl, isobutyl, sec-butyl, tert-butyl, n-pentyl, neopentyl, n-hexyl, cyclohexyl, octyl, nonyl, dodecyl, eicosyl, norbornyl and adamantyl;

alkenyl groups, such as vinyl, propenyl and cyclohexenyl;

arylalkyl groups, such as benzyl, phenylethyl and phenylpropyl; and aryl groups, such as phenyl, tolyl, dimethylphenyl, trimethylphenyl, ethylphenyl, propylphenyl, biphenyl, α- or β-naphthyl, methylnaphthyl, anthracenyl, phenanthryl, benzylphenyl, pyrenyl, acenaphthyl, phenalenyl, aceanthrylenyl, tetrahydronaphthyl, indanyl and biphenylyl.

These hydrocarbon groups may be substituted with halogens.

Examples of the rings formed by bonding of $R^1$ to $R^4$ include fused rings, such as benzene ring, naphthalene ring, acenaphthene ring and indene ring; and rings wherein the hydrogen atoms on fused rings, such as benzene ring, naphthalene ring, acenaphthene ring and indene ring, are replaced with alkyl groups, such as methyl, ethyl, propyl and butyl, or halogens.

Examples of the silicon-containing groups include monohydrocarbon-substituted silyls, such as methylsilyl and phenylsilyl; dihydrocarbon-substituted silyls, such as dimethylsilyl and diphenylsilyl; trihydrocarbon-substituted silyls, such as trimethylsilyl, triethylsilyl, tripropylsilyl, tricyclohexylsilyl, triphenylsilyl, dimethylphenylsilyl, methyldiphenylsilyl, tritolylsilyl and trinaphthylsilyl; silyl ethers of the hydrocarbon-substituted silyls, such as trimethylsilyl ether; silicon-substituted alkyl groups, such as trimethylsilylmethyl; and silicon-substituted aryl groups, such as trimethylsilylphenyl.

Examples of the oxygen-containing groups include hydroxyl group; alkoxy groups, such as methoxy, ethoxy, propoxy and butoxy; aryloxy groups, such as phenoxy, methylphenoxy, dimethylphenoxy and naphthoxy; and arylalkoxy groups, such as phenylmethoxy and phenylethoxy.

Examples of the sulfur-containing groups include those wherein oxygen is replaced with sulfur in the above-exemplified oxygen-containing groups; sulfonato groups, such as methylsulfonato, trifluoromethanesulfonato, phenylsulfonato, benzylsulfonato, p-toluenesulfonato, trimethylbenzenesulfonato, triisobutylbenzenesulfonato, p-chlorobenzenesulfonato and pentafluorobenzenesulfonato; and sulfinato groups, such as methylsulfinato, phenylsulfinato, benzenesulfinato, p-toluenesulfinato, trimethylbenzenesulfinato and pentafluorobenzenesulfinato.

Examples of the nitrogen-containing groups include amino group; alkylamino groups, such as methylamino, dimethylamino, diethylamino, dipropylamino, dibutylamino and dicyclohexylamino; and arylamino or alkylarylamino groups, such as phenylamino, diphenylamino, ditolylamino, dinaphthylamino and methylphenylamino.

Examples of the phosphorus-containing groups include dimethylphosphino and diphenylphosphino.

$X^1$ and $X^2$ $X^1$ and $X^2$ may be the same as or different from each other, and are each hydrogen atom, a halogen atom, a hydrocarbon group of 1 to 20 carbon atoms which may be halogenated, an oxygen-containing group, a sulfur-containing group or a nitrogen-containing group. Examples of these atoms and groups are the same as those described for $R^1$ to $R^4$.

Y

Y is a divalent hydrocarbon group, a divalent silicon-containing group or a divalent germanium-containing group.

Examples of the divalent hydrocarbon groups include alkylene groups, such as methylene, dimethylmethylene, 1,2-ethylene, dimethyl-1,2-ethylene, 1,3-trimethylene, 1,4-tetramethylene, 1,2-cyclohexylene and 1,4-cyclohexylene; and arylalkylene groups, such as diphenylmethylene and diphenyl-1,2-ethylene.

Examples of the divalent silicon-containing groups include alkylsilylene, alkylarylsilylene and arylsilylene groups, such as methylsilylene, dimethylsilylene, diethylsilylene, di(n-propyl)silylene, di(i-propyl)silylene, di(cyclohexyl)silylene, methylphenylsilylene, diphenylsilylene, di(p-tolyl)silylene and di(p-chlorophenyl)silylene; and alkyldisilyl, alkylaryldisilyl and aryldisilyl groups, such as tetramethyl-1,2-disilyl and tetraphenyl-1,2-disilyl.

Examples of the divalent germanium-containing groups include those wherein silicon is replaced with germanium in the above-exemplified divalent silicon-containing groups.

Listed below are examples of the transition metal compounds [I].

Dimethylsilylene-bis(indenyl)zirconium dichloride,
Dimethylsilylene-bis(indenyl)zirconium dibromide,
Dimethylsilylene-bis(indenyl)dimethyl zirconium,
Dimethylsilylene-bis(indenyl)diphenyl zirconium,
Dimethylsilylene-bis(indenyl)methylzirconium monochloride,
Dimethylsilylene-bis(indenyl)zirconiumbis (methanesulfonate),
Dimethylsilylene-bis(indenyl)zirconiumbis(p-toluenesulfonate),
Dimethylsilylene-bis(indenyl)zirconiumbis (trifluoromethanesulfonate),
Dimethylsilylene-bis(indenyl)zirconium trifluoromethanesulfonate,
Dimethylsilylene-(indenyl)(cyclopentadienyl)zirconium dichloride,
Dimethylsilylene-bis(2-methylindenyl)zirconium dichloride,
Dimethylsilylene-bis(2-methyl-4-phenylindenyl) zirconium dichloride,
Dimethylsilylene-(indenyl)(fluorenyl)zirconium dichloride,
Dimethylsilylene-(cyclopentadienyl)(fluorenyl) zirconium dichloride,
Dimethylsilylene-bis(fluorenyl)zirconium dichloride,
Diphenylsilylene-bis(indenyl)zirconium dichloride,
Methylphenylsilylene-bis(indenyl)zirconium dichloride,
Ethylene-bis(indenyl)dimethyl zirconium,
Ethylene-bis(indenyl)zirconium dichloride,
Ethylene-bis (indenyl)zirconiumbis (trifluoromethanesulfonate),
Ethylene-bis(indenyl)zirconiumbis (methanesulfonate),
Ethylene-bis(indenyl)zirconiumbis(p-toluenesulfonate),
Ethylene-bis(indenyl)zirconiumbis(p-chlorobenzenesulfonate),
Isopropylidene-bis(cyclopentadienyl)(fluorenyl) zirconium dichloride,
Isopropylidene-bis(cyclopentadienyl)(indenyl)zirconium dichloride,
Isopropylidene-(4-methylcyclopentadienyl)(2-methylindenyl)zirconium dichloride,
Isopropylidene-(3-tert-butylcyclopentadienyl)(fluorenyl) zirconium dichloride,
Dimethylsilylene-bis(4,5-benzoindenyl)zirconium dichloride,
Dimethylsilylene-bis(2-methyl-4,5-benzoindenyl) zirconium dichloride,
Dimethylsilylene-(2-methyl-4,5-benzoindenyl)(2,7-di-tert-butylfluorenyl)zirconium dichloride,
Ethylene-bis(2-methyl-4,5-benzoindenyl)zirconium dichloride,
Methylene-bis(2-methyl-4-phenylindenyl)zirconium dichloride,
Ethylene-bis(2-methyl-4-phenylindenyl)zirconium dichloride,
Dimethylsilylene-bis(2-ethyl-4-phenylindenyl)zirconium dichloride,
Dimethylsilylene-bis(2-ethyl-4-(α-naphthyl)indenyl) zirconium dichloride,
Ethylene-bis(2-ethyl-4-phenylindenyl)zirconium dichloride,
Ethylene-bis(2-ethyl-4-(α-naphthyl)indenyl)zirconium dichloride,
Ethylene-bis(2-n-propyl-4-(α-naphthyl)indenyl) zirconium dichloride,
Ethylene-bis(2,4,7-trimethylindenyl)zirconium dichloride, and
Isopropylidene-bis(2,4,7-trimethylindenyl)zirconium dichloride.

As the compound [II] capable of activating the transition metal compound [I] (sometimes referred to as "component [II]" hereinafter), there is employed at least one compound selected from:

(II-1) an organoaluminum compound,
(II-2) an aluminoxane, and
(II-3) a compound which reacts with the transition metal compound [I] to form an ion pair.

The organoluminum compound (II-1) (sometimes referred to as "component (II-1)" hereinafter) is represented by, for example, the following formula (i):

$$R^a{}_n AlX_{3-n} \quad (i)$$

wherein $R^a$ is a hydrocarbon group of 1 to 12 carbon atoms, X is a halogen atom or hydrogen atom, and n is 1 to 3.

In the formula (i), $R^a$ is a hydrocarbon group of 1 to 12 carbon atoms, e.g., an alkyl group, a cycloalkyl group or an aryl group. Particular examples thereof include methyl, ethyl, n-propyl, isopropyl, isobutyl, pentyl, hexyl, octyl, cyclopentyl, cyclohexyl, phenyl and tolyl.

Examples of such organoaluminum compounds (II-1) include:

trialkylaluminums, such as trimethylaluminum, triethylaluminum, triisopropylaluminum, triisobutylaluminum, trioctylaluminum and tri-2-ethylhexylaluminum;

alkenylaluminums, such as isoprenylaluminum;

dialkylaluminum halides, such as dimethylaluminum chloride, diethylaluminum chloride, diisopropylaluminum chloride, diisobutylaluminum chloride and dimethylaluminum bromide;

alkylaluminum sesquihalides, such as methylaluminum sesquichloride, ethylaluminum sesquichloride, isopropylaluminum sesquichloride, butylaluminum sesquichloride and ethylaluminum sesquibromide;

alkylaluminum dihalides, such as methylaluminum dichloride, ethylaluminum dichloride, isopropylaluminum dichloride and ethylaluminum dibromide; and alkylaluminum hydrides, such as diethylaluminum hydride and diisobutylaluminum hydride.

Also employable as the organoaluminum compound (II-1) is a compound represented by the following formula (ii):

$$R^a{}_n AlY_{3-n} \quad (ii)$$

wherein $R^a$ is the same as above, Y is —$OR^b$ group, —$OSiR^c{}_3$ group, —$OAlR^d{}_2$ group, —$NR^e{}_2$ group, —$SiR^f{}_3$ group or —$N(R^g)AlR^h{}_2$ group, n is 1 to 2, $R^b$, $R^c$, $R^d$ and $R^h$ are each methyl, ethyl, isopropyl, isobutyl, cyclohexyl, phenyl or the like, $R^e$ is hydrogen atom, or methyl, ethyl, isopropyl, phenyl, trimethylsilyl or the like, and $R^f$ and $R^g$ are each methyl, ethyl or the like.

Examples of such organoaluminum compounds include:

(1) compounds of the formula $R^a{}_nAl(OR^b)_{3-n}$, e.g., dimethylaluminum methoxide, diethylaluminum ethoxide and diisobutylaluminum methoxide;

(2) compounds of the formula $R^a{}_nAl(OSiR^c{}_3)_{3-n}$, e.g., $Et_2Al(OSiMe_3)$, $(iso-Bu)_2Al(OSiMe_3)$ and $(iso-Bu)_2Al(OSiEt_3)$;

(3) compounds of the formula $R^a{}_nAl(OAlR^d{}_2)_{3-n}$, e.g., $Et_2AlOAlEt_2$ and $(iso-Bu)_2AlOAl(iso-Bu)_2$;

(4) compounds of the formula $R^a{}_nAl(NR^e{}_2)_{3-n}$, e.g., $Me_2AlNEt_2$, $Et_2AlNHMe$, $Me_2AlNHEt$, $Et_2AlN(SiMe_3)_2$ and $(iso-Bu)_2AlN(SiMe_3)_2$;

(5) compounds of the formula $R^a{}_nAl(SiR^f{}_3)_{3-n}$, e.g., $(iso-Bu)_2AlSiMe_3$; and (6) compounds of the formula $R^a{}_nAl(N(R^g)AlR^h{}_2)3-n$, e.g., $Et_2AlN(Me)AlEt_2$ and $(iso-Bu)_2AlN(Et)Al(iso-Bu)_2$.

Of these, preferable are compounds of the formulas $R^a{}_3Al$, $R^a{}_nAl(OR^b)_{3-n}$ and $R^a{}_nAl(OAlR^d{}_2)_{3-n}$, and particularly preferable are compounds of said formulas wherein $R^a$ is an isoalkyl group and n is 2.

The organoaluminum compounds (II-1) can be used in combination.

The aluminoxane (II-2) (sometimes referred to as "component (II-2)" hereinafter) may be a benzene-soluble aluminoxane conventionally known or a benzene-insoluble organoaluminum oxy-compound disclosed in Japanese Patent Laid-Open Publication No. 276807/1990.

The aluminoxane can be prepared by, for example, the following processes.

(1) An organoaluminum compound such as trialkylaluminum is added to a hydrocarbon medium suspension of compounds containing adsorbed water or salts containing water of crystallization, e.g., magnesium chloride hydrate, copper sulfate hydrate, aluminum sulfate hydrate, nickel sulfate hydrate or cerous chloride hydrate, so as to allow the organoaluminum compound to react with the adsorbed water or the water of crystallization.

(2) Water, ice or water vapor is allowed to directly act on an organoaluminum compound such as trialkylaluminum in a medium such as benzene, toluene, ethyl ether or tetrahydrofuran.

(3) An organotin oxide such as dimethyltin oxide or dibutyltin oxide is allowed to react with an organoaluminum compound such as trialkylaluminum in a medium such as decane, benzene or toluene.

The aluminoxane may contain a small amount of an organometallic component. Further, it is also possible that the solvent or the unreacted organoaluminum compound is distilled off from the recovered solution of aluminoxane and the remainder is redissolved in a solvent.

Examples of the organoaluminum compounds used for preparing the aluminoxane are the same as those described for the organoaluminum compound (II-1).

Of these, trialkylaluminums and tricycloalkylaluminums are particularly preferable.

The organoaluminum compounds can be used in combination.

Examples of the solvents used for preparing the aluminoxane include aromatic hydrocarbons, such as benzene, toluene, xylene, cumene and cymene; aliphatic hydrocarbons, such as pentane, hexane, heptane, octane, decane, dodecane, hexadecane and octadecane; alicyclic hydrocarbons, such as cyclopentane, cyclohexane, cyclooctane and methylcyclopentane; petroleum fractions, such as gasoline, kerosine and gas oil; and halides of these aromatic, aliphatic and alicyclic hydrocarbons, particularly chlorides and bromides thereof. Also employable are ethers such as ethyl ether and tetrahydrofuran. Of the solvents, particularly preferable are aromatic hydrocarbons.

In the benzene-insoluble organoaluminum oxy-compound, an Al component which is soluble in benzene at 60° C. is contained in an amount of not more than 10%, preferably not more than 5%, particularly preferably not more than 2%, in terms of Al atom, and this compound is insoluble or scarcely soluble in benzene.

The benzene-solubility of the organoaluminum oxy-compound can be determined in the following manner. The organoaluminum oxy-compound corresponding to 100 mg·atom of Al is suspended in 100 ml of benzene and mixed at 60° C. for 6 hours with stirring. The resulting mixture is then subjected to hot filtration at 60° C. by means of a G-5 glass filter equipped with a jacket. The solid separated on the filter is washed four times with 50 ml of benzene at 60° C. Then, the amount (x mmol) of Al atom present in the whole filtrate is measured to determine the benzene-solubility (x %).

The compound (II-3) which reacts with the transition metal compound (I) to form an ion pair (sometimes referred to as "component (II-3)" hereinafter) includes Lewis acid, ionic compounds and carborane compounds described in Japanese Patent Laid-Open Publications No. 501950/1989 and No. 502036/1989, No. 179005/1991, No. 179006/1991, No. 207703/1991 and No. 207704/1991, and U.S. Pat. No. 5,321,106.

Examples of the Lewis acid include triphenylboron, tris(4-fluorophenyl)boron, tris(p-tolyl)boron, tris(o-tolyl)boron, tris(3,5-dimethylphenyl)boron, tris(pentafluorophenyl) boron, $MgCl_2$, $Al_2O_3$ and $SiO_2$—$Al_2O_3$.

Examples of the ionic compounds include triphenylcarbeniumtetrakis(pentafluorophenyl)borate, tri-n-butylammoniumtetrakis(pentafluorophenyl)borate, N,N-dimethylaniliniumtetrakis(pentafluorophenyl)borate and ferroceniumtetra(pentafluorophenyl)borate.

Examples of the carborane compounds include decaborane, 1-carbaundecaborane, bis-n-butylammonium (1-carbedodeca)borate, tri-n-butylammonium(7,8-dicarbaundeca)borate and tri-n-butylammonium (tridecahydride-7-carbaundeca)borate.

The component (II-3) can be used in combination of two or more kinds.

As the compound [II] capable of activating the transition metal compound [I], the component (II-1), the component (II-2) and the component (II-3) can be used in combination.

The carrier [III] employable in the invention is a granular or fine particle solid having a particle diameter of 10 to 300 μm, preferably 20 to 200 μm.

As the carrier, a porous inorganic oxide is preferably employed. Examples of such oxides include $SiO_2$, $Al_2O_3$, $MgO$, $ZrO_2$, $TiO_2$, $B_2O_3$, $CaO$, $ZnO$, $BaO$, $ThO_2$, $V_2O_5$, $Cr_2O_3$ and mixtures thereof such as $SiO_2$—$MgO$, $SiO_2$—$Al_2O_3$, $SiO_2$—$TiO_2$, $SiO_2$—$V_2O_5$, $SiO_2$—$Cr_2O_3$ and $SiO_2$—$TiO_2$—$MgO$. Of these, preferable is a carrier containing $SiO_2$ and/or $Al_2O_3$ as its major component.

The above-mentioned inorganic oxides may contain small amounts of carbonate component, sulfate component, nitrate component and oxide component, such as $Na_2CO_3$, $K_2CO_3$, $CaCO_3$, $MgCO_3$, $Na_2SO_4$, $Al_2(SO_4)_3$, $BaSO_4$, $KNO_3$, $Mg(NO_3)_2$, $Al(NO_3)_3$, $Na_2O$, $K_2O$ and $Li_2O$.

The properties of the carrier [III] vary depending on the type of the carrier and the process for the preparation thereof, but preferably used in the invention is a carrier having a specific surface area of 50 to 1,000 m²/g, preferably 100 to 700 m²/g, and a pore volume of 0.3 to 2.5 cm³/g.

The inorganic carrier may be optionally used after calcined at a temperature of 100 to 1,000° C., preferably 150 to 700° C.

The quantity of the adsorbed water on the carrier [III] is preferably less than 1.0% by weight, more preferably less than 0.5% by weight, and the quantity of the surface hydroxyl group is preferably not less than 1.0% by weight, more preferably 1.5 to 4.0% by weight, particularly preferably 2.0 to 3.5% by weight.

The quantity (% by weight) of the adsorbed water on the carrier can be determined by measuring a loss in weight of the carrier after drying the carrier at 200° C. under atmospheric pressure for 4 hours in a stream of nitrogen.

The quantity (% by weight) of the surface hydroxyl group in the carrier is determined in the following manner. The weight of a carrier which has been dried at 200° C. under atmospheric pressure for 4 hours in a stream of nitrogen is taken as X (g), and the weight of a carrier which has been calcined at 1,000° C. for 20 hours to remove the surface hydroxyl group is taken as Y (g). The quantity of the surface hydroxyl group is calculated in accordance with the following equation.

$$\text{Quantity of surface hydroxyl group (\% by weight)} = \{(X-Y)/X\} \times 100$$

Also employable as the carrier [III] is an organic compound. For example, (co)polymers produced mainly from α-olefins of 2 to 14 carbon atoms such as ethylene, propylene, 1-butene and 4-methyl-1-pentene or (co) polymers produced mainly from vinylcyclohexane or styrene are employable.

The catalyst preferably used for preparing the ethylene type polymer (A) and the ethylene type polymer (B) is a carrier supported metallocene catalyst (solid catalyst) wherein the transition metal compound [I] and the component [II] are supported on the carrier [III].

The solid catalyst can be prepared by contacting the component [I], the component [II] and the component [III] in an optional order, but it is preferable that the component [II] is contacted with the carrier [III] and then with the transition metal compound [I].

These components can be contacted in an inert hydrocarbon solvent. Examples of the solvents employable herein include aliphatic hydrocarbons, such as propane, butane, pentane, hexane, heptane, octane, decane, dodecane and hexadecane; alicyclic hydrocarbons, such as cyclopentane, cyclohexane, methylcyclopentane and cyclooctane; aromatic hydrocarbons, such as benzene, toluene and xylene; halogenated hydrocarbons, such as ethylene chloride, chlorobenzene and dichloromethane; petroleum fractions, such as gasoline, kerosine and gas oil; and mixtures thereof.

For preparing the catalyst from the above components, the transition metal compound [I] is used in an amount of $5 \times 10^{-6}$ to $5 \times 10^{-4}$ mol, preferably $10^{-5}$ to $2 \times 10^{-4}$ mol, based on 1 g of the carrier [III]. The component [II] is used in such an amount that the atomic ratio of aluminum or boron in the component [II] to the transition metal in the transition metal compound [I], Al or B/transition metal, is usually 10 to 500 preferably 20 to 200. When the organoaluminum compound (II-1) and the aluminoxane (II-2) are used as the component [II], they are desirably used in such amounts that the atomic ratio of the aluminum atom (Al-1) in the component (II-1) to the aluminum atom (Al-2) in the component (II-2), Al-1/Al-2, is 0.02 to 3, preferably 0.05 to 1.5.

These components are contacted at a temperature of usually −50 to 150° C., preferably −20 to 120° C., for a period of usually 1 minute to 50 hours, preferably 10 minutes to 25 hours.

In the solid catalyst prepared above, the transition metal compound [I] is supported in an amount of preferably $5 \times 10^{-6}$ to $5 \times 10^{-4}$ g·atom, more preferably $10^{-5}$ to $2 \times 10^{-4}$ g·atom, in terms of the transition metal atom, based on 1 g of the carrier [III]. The component [II] is supported in an amount of preferably $10^{-3}$ to $5 \times 10^{-2}$ g·atom, more preferably $2 \times 10^{-3}$ to $2 \times 10^{-2}$ g·atom, in terms of aluminum atom or boron atom, based on 1 g of the carrier [III].

In the (co)polymerization using ethylene, the solid catalyst can be used as it is, but it may be used in the form of a prepolymerized catalyst obtained by prepolymerizing an olefin onto the solid catalyst.

The prepolymerized catalyst can be prepared by prepolymerizing an olefin in the presence of the above components [I] to [III] and generally in an inert hydrocarbon solvent. It is preferable that a solid catalyst is formed from the components [I] to [III]. In addition to the solid catalyst, the component [II] may be further added.

In the prepolymerization, the transition metal compound [I] is used in an amount of usually $5 \times 10^{-6}$ to $5 \times 10^{-4}$ mol, preferably $10^{-5}$ to $2 \times 10^{-4}$ mol, based on 1 g of the carrier [III]. The component [II] is used in such an amount that the atomic ratio of aluminum or boron in the component [II] to the transition metal in the transition metal compound [I], Al or B/transition metal, is usually 10 to 500, preferably 20 to 200. When the organoaluminum compound (II-1) and the aluminoxane (II-2) are used as the component [II], they are desirably used in such amounts that the atomic ratio of the aluminum atom (Al-1) in the component (II-1) to the aluminum atom (Al-2) in the component (II-2), Al-1/Al-2, is 0.02 to 3, preferably 0.05 to 1.5.

In the prepolymerization system, the concentration of the transition metal compound [I] or the solid catalyst formed from the components (transition metal/i liter of polymerization volume) is desired to be usually $10^{-6}$ to $2 \times 10^{-2}$ mol/liter, preferably $5 \times 10^{-5}$ to $10^{-2}$ mol/liter.

The prepolymerization is carried out at a temperature of usually −20 to 60° C., preferably 0 to 50° C., for a period of usually 0.5 to 100 hours, preferably 1 to 50 hours.

As the olefins for the prepolymerization, ethylene and the aforesaid α-olefins of 3 to 20 carbon atoms are employable. These olefins may be copolymerized.

For preparing the prepolymerized catalyst, an olefin may be introduced into a solid catalyst suspension prepared by the use of an inert hydrocarbon solvent, or it is also possible that after separating the solid catalyst from the inert hydrocarbon solvent suspension, the solid catalyst is resuspended in an inert hydrocarbon and into the resulting suspension is introduced an olefin. In more detail, the prepolymerized catalyst can be prepared by, for example, the following process.

The carrier [III] is suspended in an inert hydrocarbon. To the suspension, the component [II] (e.g., component (II-2)) is added to react them for a given period of time. Then, the supernatant liquid is removed, and the resulting solid component is resuspended in an inert hydrocarbon. To the system, the transition metal compound [I] is added to perform reaction for a given period of time. Then, the supernatant liquid is removed to obtain a solid catalyst.

Then, the solid catalyst is added to an inert hydrocarbon containing the organoaluminum compound (component (II-1)). To the system, an olefin is introduced to perform polymerization. Thus, a prepolymerized catalyst is obtained.

It is desirable that through the prepolymerization an olefin polymer (prepolymer) is produced in an amount of 0.1 to 500 g, preferably 0.2 to 300 g, more preferably 0.5 to 200 g, based on 1 g of the carrier [III].

In the prepolymerized catalyst thus obtained, the transition metal compound [I] is desired to be supported in an amount of about $5 \times 10^{-6}$ to $5 \times 10^{-4}$ g·atom, preferably $10^{-5}$ to $2 \times 10^{-4}$ g·atom, in terms of the transition metal, based on 1 g of the carrier [III], and the component [II] is desired to be supported in such an amount that the molar ratio of aluminum or boron in the component [II] to the transition metal atom, Al or B/transition metal, is 5 to 200, preferably 10 to 150.

The prepolymerization can be carried out by any of batchwise and continuous processes, and it can be carried out under reduced pressure, atmospheric pressure or application of pressure.

In the prepolymerization, it is desirable that a prepolymer having an intrinsic viscosity (η) (measured in decalin at 135° C.) of about 0.2 to 7 dl/g, preferably about 0.5 to 5 dl/g, is produced by allowing hydrogen to coexist in the system.

In the preparation of the ethylene type polymer (A) and the ethylene type polymer (B), ethylene is polymerized or copolymerized with another α-olefin in the presence of the solid catalyst or the prepolymerized catalyst.

The polymerization can be carried out by any of liquid polymerization process, such as suspension polymerization process or solution polymerization process, and gas phase polymerization process. Further, the polymerization can be carried out by any of batchwise, semi-continuous and continuous processes.

In the liquid polymerization process, an inert hydrocarbon solvent is employable, and examples thereof include the same solvents as shown in the preparation of the catalyst.

In the polymerization, the solid catalyst or the prepolymerized catalyst is desirably used in such an amount that the concentration of the transition metal in the polymerization volume (transition metal/polymerization volume-liter) is usually $10^{-8}$ to $10^{-3}$ g·atom/liter, preferably $10^{-7}$ to $10^{-4}$ g·atom/liter.

In the polymerization using the prepolymerized catalyst, the component (II) may be added. The component (II) can be used in such an amount that the atomic ratio of aluminum or boron in the component (II) to the transition metal atom used in the polymerization, Al or B/transition metal, is 5 to 300, preferably 10 to 200, more preferably 15 to 150.

The polymerization can be carried out at a temperature of usually −50 to 200° C., preferably 0 to 100° C., under a pressure of usually atmospheric pressure to 100 kg/cm², preferably atmospheric pressure to 50 kg/cm². The polymerization may be conducted in two or more stages under different reaction conditions.

When the ethylene type polymer (A) and the ethylene type polymer (B) are prepared by a suspension polymerization process, the polymerization temperature for each case is 0 to 200° C., preferably 20 to 150° C. In the solution polymerization process, the polymerization temperature for each case is 50 to 120° C., preferably 60 to 110° C.

The molecular weight of the resulting ethylene type polymer can be controlled by allowing hydrogen to exist in the polymerization system or by changing the polymerization temperature or the polymerization pressure.

Ethylene Type Polymer Composition

The ethylene type polymer composition according to the invention comprises the ethylene type polymer (A) and the ethylene type polymer (B). In this composition, the ethylene type polymer (A) is contained in an amount of 20 to 90% by weight, preferably 30 to 80% by weight, more preferably 40 to 75% by weight, and the ethylene type polymer (B) is contained in an amount of 10 to 80% by weight, preferably 20 to 70% by weight, more preferably 25 to 60% by weight.

The ethylene type polymer composition is formed from the ethylene type polymer (A) and the ethylene type polymer (B) having such properties that the ratio of the density ($d_A$) of the ethylene type polymer (A) to the density ($d_B$) of the ethylene type polymer (B), $d_A/d_B$, is larger than 1, preferably larger than 1 and not larger than 1.2, more preferably 1.005 to 1.08.

The ethylene type polymer composition of the invention has the following properties.

(1) The density is in the range of 0.940 to 0.970 g/cm³, preferably 0.945 to 0.970 g/cm³, more preferably 0.950 to 0.965 g/cm³.

(2) The melt flow rate (MFR) is in the range of 0.005 to 20 g/10 min, preferably 0.008 to 8 g/10 min, more preferably 0.01 to 1.5 g/10 min.

(3) The melt tension (MT) and the melt flow rate (MFR) of this ethylene type polymer composition satisfy the following relation $$\log(MT) \geq -0.4 \log(MFR) + 0.70.$$

The melt tension of the ethylene type polymer composition, satisfying the above relation with the melt flow rate (MFR), is desired to be 1 to 100 g, preferably 2 to 50 g.

The melt tension (MT) is measured as a stress given when a molten sample is stretched at a constant rate. In the present invention, specifically, the melt tension is measured as a stress given when a molten sample (ethylene type polymer composition) is stretched by a MT measuring machine (manufactured by Toyo Seiki Seisakusho) under the conditions of a resin temperature of 190° C., an extrusion speed of 15 mm/min, a take-up rate of 10 to 20 m/min, a nozzle diameter of 2.09 mmφ and a nozzle length of 8 mm.

(4) The diametrical swell ratio exceeds 1.35, and preferably is more than 1.35 and not more than 1.65.

An ethylene type polymer composition with this swell ratio has excellent moldability. For example, by blow molding of this ethylene type polymer composition, bottles having high strength can be obtained because of good shape of pinch-off portions. Moreover, since the distribution of the wall thickness of bottles (hollow molded articles) can be narrowed, a mass per the unit area of the production can be reduced. Provided that the mass of the production is identical, bottles of higher bucking strength can be obtained.

The swell ratio of the ethylene type polymer composition can be measured in the following manner.

Capillograph-1B (barrel diameter: 10 mm, manufactured by Toyo Seiki Seisakusho) is equipped with a tubular nozzle (inner diameter ($D_o$): 3 mm, outer diameter: 4 mm, length: 10 mm), and a barrel (to be charged with a sample) is heated to 200° C. and maintained at this temperature. The barrel is charged with 10 g of a sample. Then, a piston is fitted, and degassing is performed, followed by preheating for 6 minutes. After the preheating, the sample is extruded at each piston speed of 10, 20, 30, 50 and 75 (mm/min). The strands thus extruded are measured on their diameters ($D_i$) at the position of 15 mm downward from the nozzle tip by means of laser beam.

A ratio ($SR_i = D_i/D_o$) of the strand diameter ($D_i$) measured at each piston speed to the tubular nozzle diameter ($D_o$) is plotted against the piston speed on a semi-logarithmic paper to obtain a curve. From this curve, a SR value corresponding to the piston speed of 50 (mm/min) is read out, and this value is taken as the swell ratio. It is also possible to find a shear rate of the sample correspondingly to the piston speed.

To the ethylene type polymer composition of the invention, various additives, such as weathering stabilizer, heat stabilizer, antistatic agent, anti-slip agent, anti-blocking agent, anti-fogging agent, lubricant, pigment, dye, nucleating agent, plasticizer, anti-aging agent, hydrochloric acid absorbent and antioxidant, may be added within limits not prejudicial to the object of the present invention.

The ethylene type polymer composition of the invention can be prepared by blending the ethylene type polymer (A) and the ethylene type polymer (B) by known methods, or it can be directly prepared through polymerization.

Some blending methods are given below.

(1) The ethylene type polymer (A), the ethylene type polymer (B), and if desired, other components are blended by means of an extruder, a kneader or the like.

(2) The ethylene type polymer (A), the ethylene type polymer (B), and if desired, other components are dissolved in an appropriate good solvent (e.g., hydrocarbon solvent such as hexane, heptane, decane, cyclohexane, benzene, toluene or xylene), followed by removing the solvent.

(3) The ethylene type polymer (A), the ethylene type polymer (B), and if desired, other components are each independently dissolved in an appropriate good solvent, then the resulting solutions are mixed, followed by removing the solvent.

(4) Blending is conducted by combining the above methods (1) to (3).

For directly preparing the ethylene type polymer composition comprising the ethylene type polymer (A) and the ethylene type polymer (B) through the polymerization, for example, the aforesaid polymerization may be conducted in two or more stages under different reaction conditions to prepare the ethylene type polymer (A) and the ethylene type polymer (B), thereby preparing the ethylene type polymer composition.

The ethylene type polymer composition of the invention has excellent moldability, so that it can be widely used by molding it into various articles, e.g., cans for industrial chemicals, drum cans, bottles, inflation films and pipes, through various molding (or forming) methods such as blow molding, vacuum or pressure forming, inflation molding, extrusion molding and expansion molding. The molded articles thus produced, e.g., cans for industrial chemicals, drum cans and bottles, are excellent in mechanical strength as well as in rigidity.

EFFECT OF THE INVENTION

The ethylene type polymer composition according to the invention shows excellent moldability and can be molded into articles having excellent rigidity and mechanical strength such as stress crack resistance.

EXAMPLE

The present invention will be further described with reference to the following examples, but it should be construed that the invention is in no way limited to those examples.

In the invention, properties of the ethylene type polymer composition are evaluated in the following manner.

Izod Impact Strength (IZ)

The Izod impact test was carried out in accordance with JIS K 7110. The testing temperature was −30° C.

Measurement of ESCR

ESCR was measured in accordance with ASTM D 1693.
Measuring conditions
Temperature: 50° C.
Surface active agent: Antalox CO-630
Concentration of surface active agent: 10%

Synthesis Example 1
Preparation of Solid Catalyst (a)

5.0 Grams of silica having been dried at 250° C. for 10 hours was suspended in 80 ml of toluene, and the resulting suspension was cooled to 0° C. Then, to the suspension was dropwise added 28.7 ml of a toluene solution of methylaluminoxane (Al: 1.33 mol/liter) over a period of 1 hour. During the addition, the temperature of the system was maintained at 0° C. Subsequently, the reaction was conducted at 0° C. for 30 minutes. Then, the temperature of the system was raised to 95° C. over a period of time 1.5 hours, and at this temperature the reaction was performed for 4 hours. Thereafter, the system was cooled to 60° C., and the supernatant liquid was removed by decantation.

The resulting solid component was washed twice with toluene and resuspended in 80 ml of toluene. To the system, 100 ml of a toluene solution of ethylene-bis(indenyl) zirconium dichloride (Zr: 0.00192 mmol/ml) was added at room temperature. The reaction was further conducted at 80° C. for 2 hours. Then, the supernatant liquid was removed. The remainder was washed third times with hexane to obtain a solid catalyst (a) containing 2.4 mg of zirconium per 1 g of the catalyst.

Preparation of Prepolymerized Catalyst (A)

In 200 ml of hexane, 7 g of the solid catalyst (a) prepared above was suspended. To the system was added 9.5 ml of a decane solution of triisobutylaluminum (1 mmol/ml), and the prepolymerization of ethylene was performed at 35° C. for 2 hours to obtain a prepolymerized catalyst (A) containing 2.2 mg of zirconium per 1 g of the solid catalyst and containing 3 g of an ethylene type polymer as a prepolymer.

Synthesis Example 2
Preparation of Solid Catalyst (b)

A solid catalyst (b) was obtained in the same manner as in Synthesis Example 1, except that 86 ml of a toluene solution of dimethylsilylene-bis(2-methyl-4-phenylindenyl) zirconium dichloride (Zr: 0.00223 mmol/ml) was used in place of the toluene solution of ethylene-bis(indenyl) zirconium dichloride.

Preparation of Prepolymerized Catalyst (B)

A prepolymerized catalyst (B) containing 2.0 mg of zirconium per 1 g of the solid catalyst and containing 3 g of an ethylene type polymer as a prepolymer was obtained in the same manner as in the preparation of the prepolymerized catalyst (A), except that the solid catalyst (b) was used in place of the solid catalyst (a) and the prepolymerization time was varied to 1.5 hours.

Synthesis Example 3
Preparation of Solid Catalyst (c)

A solid catalyst (c) was obtained in the same manner as in Synthesis Example 1, except that 24 ml of a toluene solution of bis(1,3-dimethylcyclopentadienyl)zirconium dichloride (Zr: 0.00778 mmol/ml) was used in place of the toluene solution of ethylene-bis(indenyl)zirconium dichloride.

Preparation of Prepolymerized Catalyst (C)

A prepolymerized catalyst (C) containing 2.3 mg of zirconium per 1 g of the solid catalyst and containing 3 g of an ethylene type polymer as a prepolymer was obtained in the same manner as in the preparation of the prepolymerized catalyst (A), except that the solid catalyst (c) was used in place of the solid catalyst (a).

Synthesis Example 4
Preparation of Solid Catalyst (d)

A solid catalyst (d) was obtained in the same manner as in Synthesis Example 1, except that 22 ml of a toluene solution of (cyclopentadienyl)(pentamethylcyclopentadienyl)zirconium dichloride (Zr: 0.00851 mmol/ml) was used in place of the toluene solution of ethylene-bis(indenyl)zirconium dichloride.

Preparation of Prepolymerized Catalyst (D)

A prepolymerized catalyst (D) containing 2.3 mg of zirconium per 1 g of the solid catalyst and containing 3 g of an ethylene type polymer as a prepolymer was obtained in the same manner as in the preparation of the prepolymerized catalyst (A), except that the solid catalyst (d) was used in place of the solid catalyst (a).

Preparation Example 1

Preparation of Ethylene Type Polymer (1)

To a 2 liter stainless steel autoclave thoroughly purged with nitrogen, 1 liter of hexane was introduced. The temperature of the system was set to 70° C., and nitrogen in the autoclave was replaced with ethylene. To the autoclave were then added 1.5 ml of a decane solution of triisobutylaluminum (1 mmol/ml) and 0.01 mmol (in terms of zirconium atom) of the prepolymerized catalyst (A).

To the autoclave, 1,500 Nml of hydrogen was added, and ethylene was then fed to initiate polymerization at the total pressure of 8 kg/cm$^2$-G. The temperature of the system immediately rose to 80° C.

Thereafter, only ethylene was supplemented to maintain the total pressure at 8 kg/cm$^2$-G, and the polymerization was conducted at 80° C. for 1.5 hours. After the polymerization was completed, the resulting polymer was filtered and dried overnight at 80° C. Thus, 284 g of an ethylene type polymer (1) (homopolyethylene) was obtained.

The ethylene type polymer (1) had a density of 0.972 g/cm$^3$, ($\eta$) of 1.3 dl/g and MFR of 18.5 g/10 min.

Preparation Example 2

Preparation of Ethylene Type Polymer (2)

Polymerization of ethylene was carried out in the same manner as in Preparation Example 1, except that an amount of hydrogen added was varied to 1,000 Nml. Thus, 446 g of an ethylene type polymer (2) (homopolyethylene) was obtained.

The ethylene type polymer (2) had a density of 0.964 g/cm$^3$, ($\eta$) of 1.71 dl/g and MFR of 1.90 g/10 min.

Preparation Example 3

Preparation of Ethylene Type Polymer (3)

Polymerization of ethylene was carried out in the same manner as in Preparation Example 1, except that no hydrogen was added. Thus, 572 g of an ethylene type polymer (3) (homopolyethylene) was obtained.

The ethylene type polymer had a density of 0.951 g/cm$^3$, ($\eta$) of 4.0 dl/g and MFR of 0.002 g/10 min.

Preparation Example 4

Preparation of Ethylene Type Polymer (4)

To a 2 liter stainless steel autoclave thoroughly purged with nitrogen, 1 liter of hexane was introduced. The temperature of the system was set to 70° C., and nitrogen in the autoclave was replaced with ethylene.

To the autoclaved were then added 40 ml of 1-hexene, 1.5 ml of a decane solution of triisobutylaluminum (1 mmol/ml) and 0.0025 mmol (in terms of zirconium atom) of the prepolymerized catalyst (A). To the autoclave was further fed ethylene to initiate polymerization at the total pressure of 8 kg/cm$^2$-G. The temperature of the system immediately rose to 80° C.

Thereafter, ethylene was supplemented to maintain the total pressure at 8 kg/cm$^2$-G, and the polymerization was conducted at 80° C. for 1.5 hours. After the polymerization was completed, the resulting polymer was filtered and dried overnight at 80° C. Thus, 437 g of an ethylene type polymer (4) (ethylene/hexene copolymer) was obtained.

In the ethylene type polymer (4), the units derived from 1-hexene were contained in amounts of 3.0% by mol. This ethylene type polymer had a density of 0.925 g/cm$^3$, ($\eta$) of 3.2 dl/g and MFR of 0.01 g/10 min.

Preparation Example 5

Preparation of Ethylene Type Polymer (5)

Polymerization of ethylene was carried out in the same manner as in Preparation Example 4, except that 5 ml of 1-hexene was added and 500 Nml of hydrogen was added. Thus, 212 g of an ethylene type polymer (5) (ethylene/hexene copolymer) was obtained.

The ethylene type polymer had a density of 0.956 g/cm$^3$, ($\eta$) of 1.8 dl/g and MFR of 1.0 g/10 min.

Preparation Example 6

Preparation of Ethylene Type Polymer (6)

Polymerization of ethylene was carried out in the same manner as in Preparation Example 4, except that an amount of 1-hexene added was varied to 10 ml. Thus, 332 g of an ethylene type polymer (6) (ethylene/hexene copolymer) was obtained.

The ethylene type polymer had a density of 0.938 g/cm$^3$, ($\eta$) of 3.0 dl/g and MFR of 0.01 g/10 min.

Example 1

Preparation of Ethylene Type Polymer Composition (1)

35 Grams of the ethylene type polymer (1) obtained in Preparation Example 1, 15 g of the ethylene type polymer (3) obtained in Preparation Example 3, 0.05 g a phenol heat stabilizer (Irganox 1076, available from Ciba-Geigy Corporation) and 0.025 g of a phosphorus heat stabilizer (Irgafos 168, available from Ciba-Geigy Corporation) were dry blended and then melt kneaded at 200° C. by means of a batchwise kneader (Laboplastomill, manufactured by Toyo Seiki Seisakusho K.K.).

The resulting ethylene type polymer composition (1) had a density of 0.966 g/cm$^3$ and MFR of 2.2 g/10 min. The results are set forth in Table 1.

Example 2

Preparation of Ethylene Type Polymer Composition (2)

An ethylene type polymer composition (2) was obtained in the same manner as in Example 1, except that the ethylene type polymer (2) was used in place of the ethylene type polymer (1) and the ethylene type polymer (4) was used in place of the ethylene type polymer (3).

The resulting ethylene type polymer composition (2) had a density of 0.951 g/cm$^3$ and MFR of 0.61 g/10 min. The results are set forth in Table 1.

Example 3

Preparation of Ethylene Type Polymer Composition (3)

To a 2 liter stainless steel autoclave thoroughly purged with nitrogen, 1 liter of hexane was introduced. The temperature of the system was set to 70° C., and nitrogen in the autoclave was replaced with ethylene. To the autoclave were then added 1.5 ml of a decane solution of triisobutylaluminum (1 mmol/ml) and 0.005 mmol (in terms of zirconium atom) of the prepolymerized catalyst (B). To the autoclave was further fed ethylene to initiate polymerization at the total pressure of 8 kg/cm$^2$-G. The temperature of the system immediately rose to 80° C. Thereafter, only ethylene was supplemented to maintain the total pressure at 8 kg/cm$^2$-G, and the polymerization was conducted at 80° C. for 0.5 hour (referred to step (i)).

After the polymerization was completed, feeding of ethylene was terminated. Then, a mixed gas of ethylene and hydrogen (hydrogen content: 0.7% by mol) was fed to perform polymerization at 80° C. for 1 hour (referred to step (ii)).

After the polymerization was completed, the resulting polymer was filtered and dried overnight at 80° C. Thus, 264 g of an ethylene type polymer composition (3) was obtained.

50 Grams of the ethylene type polymer composition (3), 0.05 g a phenol heat stabilizer (Irganox 1076, available from Ciba-Geigy Corporation) and 0.025 g of a phosphorus heat stabilizer (Irgafos 168, available from Ciba-Geigy Corporation) were dry blended and then melt kneaded at 200° C. by means of a batchwise kneader (Laboplastomill, manufactured by Toyo Seiki Seisakusho K.K.).

The resulting ethylene type polymer composition (3) had a density of 0.958 g/cm$^3$ and MFR of 0.02 g/10 min (intrinsic viscosity ($\eta$): 3.57 dl/g).

As a result of the operation of the step (i) only, 106 g of an ethylene type polymer having a density of 0.941 g/cm$^3$ and an intrinsic viscosity ($\eta$) of 6.83 dl/g was obtained. From the results, the density, the intrinsic viscosity ($\eta$) and the amount of the ethylene type polymer obtained through the step (ii) were calculated to be 0.970 g/cm$^3$, 1.38 dl/g (MFR: 5.6 g/10 min) and 158 g, respectively. The results are set forth in Table 1.

Example 4

Preparation of Ethylene Type Polymer Composition (4)

Polymerization was carried out in the same manner as in Example 3, except that in the step (i) a mixed gas of ethylene and 1-butene (1-butene content: 0.476% by mol) was used in place of ethylene and the polymerization time was varied to 0.2 hour (referred to step (iii)) and, in the step (ii) a mixed gas having a hydrogen content of 1.9% by mol was used as the mixed gas of ethylene and hydrogen and the polymerization time was varied to 1.3 hours (referred to step (iv)).

After the polymerization was completed, the resulting polymer was filtered and dried overnight at 80° C. Thus, 250 g of an ethylene type polymer composition (4) was obtained.

The ethylene type polymer composition (4) was melt kneaded with the stabilizers in the same manner as in Example 3.

The resulting ethylene type polymer composition (4) had a density of 0.962 g/cm$^3$ and MFR of 0.12 g/10 min (intrinsic viscosity ($\eta$): 2.43 dl/g).

As a result of the operation of the step (iii) only, 75 g of an ethylene type polymer having a density of 0.939 g/cm$^3$ and an intrinsic viscosity ($\eta$) of 5.80 dl/g was obtained. From the results, the density, the intrinsic viscosity ($\eta$) and the amount of the ethylene type polymer obtained by the step (iv) were calculated to be 0.972 g/cm$^3$, 1.00 dl/g (MFR: 50 g/10 min) and 175 g, respectively. The results are set forth in Table 1.

Comparative Example 1

Preparation of Ethylene Type Polymer Composition (7)

An ethylene type polymer composition (7) was obtained in the same manner as in Example 1, except that 30 g of an ethylene type polymer (5) was used in place of the ethylene type polymer (1) and 20 g of the ethylene type polymer (6) was used in place of the ethylene type polymer (3).

The resulting ethylene type polymer composition (7) had a density of 0.951 g/cm$^3$ and MFR of 0.5 g/10 min. The results are set forth in Table 1.

TABLE 1

| | | Ex.1 | Ex.2 | Ex.3 | Ex.4 | Comp. Ex.1 |
|---|---|---|---|---|---|---|
| Ethylene type polymer (A) | Density ($d_A$) (g/cm$^3$) | 0.972 | 0.964 | 0.97 | 0.972 | 0.956 |
| | ($\eta$) (dl/g) | 1.3 | 1.71 | 1.38 | 1.00 | 1.8 |
| | MFR (g/10 min) | 18.5 | 1.9 | 5.6 | 50 | 1.0 |
| Ethylene type polymer (B) | Density (dB) (g/cm$^3$) | 0.951 | 0.925 | 0.941 | 0.939 | 0.938 |
| | ($\eta$) (dl/g) | 4.0 | 3.2 | 6.83 | 5.8 | 3.0 |
| | MFR (g/10 min) | 0.002 | 0.01 | — | — | 0.01 |
| Ethylene type polymer composition | (A)/(B) (by weight) | 70/30 | 70/30 | 60/40 | 70/30 | 60/40 |
| | $d_A/d_B$ | 1.02 | 1.04 | 1.03 | 1.034 | 1.02 |
| | Density (g/cm$^3$) | 0.966 | 0.951 | 0.958 | 0.962 | 0.951 |
| | MFR (g/10 min) | 2.2 | 0.61 | 0.02 | 0.12 | 0.5 |
| | MT (g) | 4 | 9 | 30 | 12 | 8 |
| | log (MT) | 0.60 | 0.95 | 1.48 | 1.08 | 0.90 |
| | −0.4 log (MFR) +0.70 | 0.56 | 0.79 | 1.38 | 1.07 | 0.82 |
| | Swell ratio | 1.38 | 1.47 | 1.40 | 1.38 | 1.40 |
| | IZ (kg.cm/cm) | 3.0 | 12 | 30 | 40 | 10 |
| | ESCR | 3 | 30 | 130 | 40 | 10 |

It has been confirmed that the ethylene type polymer compositions obtained in Examples 1 to 4 have excellent moldability, mechanical strength, rigidity and ESCR.

What is claimed is:

1. An ethylene polymer composition comprising:

(A) a first ethylene polymer in an amount of 20 to 90% by weight, said first ethylene polymer being an ethylene polymer or a copolymer of ethylene and an $\alpha$-olefin of 3 to 20 carbon atoms and having the following properties:

(A-1) the density ($d_A$) is in the range of 0.96 to 0.98 g/cm$^3$; and (A-2) the intrinsic viscosity ($\eta$), as measured in decalin at 135° C., is in the range of 0.5 to 3.0 dl/g; and (B) a second ethylene polymer in an amount of 80 to 10% by weight, said second ethylene polymer being an ethylene polymer or a copolymer of ethylene and an $\alpha$-olefin of 3 to 20 carbon atoms and having the following properties:

(B-1) the density ($d_B$) is in the range of 0.91 to 0.965 g/cm$^3$, and (B-2) the intrinsic viscosity ($\eta$), as measured in decalin at 135° C., is in the range of 3.0 to 10 dl/g;

at least one of said first ethylene polymer (A) and said second ethylene polymer (B) being an ethylene polymer prepared by the use of a metallocene catalyst wherein said ethylene polymer composition has the following properties:

(1) a ratio ($d_A/d_B$) of the density ($d_A$) of the first ethylene polymer (A) to the density ($d_B$) of the second ethylene polymer (B) is larger than 1;

(2) the density is in the range of 0.940 to 0.970 g/cm$^3$;

(3) the melt flow rate (MFR, measured at 190° C. under a load of 2.16 kg) is in the range of 0.005 to 20 g/10 min;

(4) the melt flow rate (MFR) and the melt tension (MT) satisfy the following relation log(MT) $\geq$ −0.4 log(MFR)+0.7; and (5) the diametrical swell ratio exceeds 1.35, wherein the diametrical swell ratio is measured in the following manner:

Capillograph—1B (barrel diameter: 10 mm, manufactured by Toyo Seiki Seisakusho) is equipped with a tubular nozzle (inner diameter ($D_o$): 3 mm, outer diameter: 4 mm, length: 10 mm) and a barrel (to be charged with a sample) is heated to 200° C. and maintained at that temperature; the barrel is charged with 10 g of a sample; then, a piston is fitted, and degassing is performed, followed by preheating for 6 minutes; after the preheating, the sample is extruded at each piston speed of 10, 20, 30, 50 and 75 mm/min; the diameter ($D_i$) of the strands thus extruded are measured at a position 15 mm downward from the nozzle tip; a ratio ($D_i/D_o$) of the strand diameter ($D_i$) measured at each piston speed to the tubular nozzle diameter ($D_o$) is plotted against the piston speed on semi-logarithmic paper to obtain a curve; from this curve, a ratio corresponding to the piston speed of 50 mm/min is read out, and this value is taken as the diametrical swell ratio.

2. The ethylene polymer composition as claimed in claim 1, wherein the first ethylene polymer (A) and/or the second ethylene polymer (B) is prepared by the use of a carrier supported metallocene catalyst comprising:

[I] a transition metal compound represented by the following formula (I):

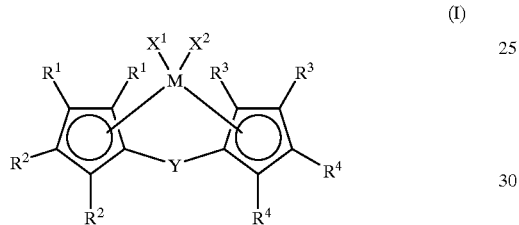

(I)

wherein M is a transition metal atom of Group 4 to Group 6 of the periodic table, $R^1$, $R^2$, $R^3$ and $R^4$ are the same as or different from each other, they are each hydrogen atom, a halogen atom, a hydrocarbon group of 1 to 20 carbon atoms, a halogenated hydrocarbon group of 1 to 20 carbon atoms, a silicon-containing group, an oxygen-containing group, a sulfur-containing group, a nitrogen-containing group, a phosphorus-containing group, or a part of the adjacent groups of $R^1$ to $R^4$ are bonded to each other to form at least one ring together with carbon atoms to which they are bonded, $X^1$ and $X^2$ are the same as or different from each other, and are each hydrogen atom, a halogen atom, a hydrocarbon group of 1 to 20 carbon atoms, a halogenated hydrocarbon group of 1 to 20 carbon atoms, an oxygen-containing group, a sulfur-containing group or a nitrogen-containing group, and Y is a divalent hydrocarbon group, a divalent silicon-containing group or a divalent germanium-containing group;

[II] a compound which is capable of activating the transition metal compound [I] and is at least one compound selected from:

(II-1) an organoaluminum compound, (II-2) an aluminoxane, and (II-3) a compound which reacts with the transition metal compound [I] to form an ion pair; and

[III] a particle carrier.

* * * * *